(12) United States Patent
Zenner et al.

(10) Patent No.: US 10,333,338 B2
(45) Date of Patent: Jun. 25, 2019

(54) CHARGING METHOD AND ASSEMBLY UTILIZING A MULE VEHICLE WITH A STORAGE BATTERY

(71) Applicant: Ford Global Technologies, LLC, Dearborn, MI (US)

(72) Inventors: Thomas Zenner, Dueren (DE); Mazen Hammoud, Ann Arbor, MI (US); Kevin Layden, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 15/790,190

(22) Filed: Oct. 23, 2017

(65) Prior Publication Data
US 2019/0123578 A1    Apr. 25, 2019

(51) Int. Cl.
| | | |
|---|---|---|
| *B62D 59/04* | (2006.01) | |
| *H02J 7/14* | (2006.01) | |
| *B60L 15/20* | (2006.01) | |
| *B60L 11/18* | (2006.01) | |
| *H02J 7/00* | (2006.01) | |
| *B60L 3/00* | (2019.01) | |
| *B60L 7/18* | (2006.01) | |

(52) U.S. Cl.
CPC .......... *H02J 7/1461* (2013.01); *B60L 3/0046* (2013.01); *B60L 7/18* (2013.01); *B60L 11/1805* (2013.01); *B60L 11/1861* (2013.01); *B60L 15/2009* (2013.01); *H02J 7/0042* (2013.01)

(58) Field of Classification Search
CPC . H02J 7/14; H02J 7/0042; B60L 11/18; B60L 11/1861; B60L 11/1816; B60L 2200/28; B60K 2001/0444; B62D 59/04
See application file for complete search history.

(56) References Cited

U.S. PATENT DOCUMENTS

| | | | |
|---|---|---|---|
| 3,090,871 A |  | 5/1963 | Gorman |
| 5,283,513 A | * | 2/1994 | Fujita ................. B60L 11/1816 307/10.1 |
| 5,607,279 A | * | 3/1997 | Hill ......................... B60P 3/122 414/478 |
| 6,866,350 B2 | * | 3/2005 | Palmer ..................... B60K 6/48 303/152 |
| 8,496,078 B2 | * | 7/2013 | Wellborn ............... B62D 59/04 180/14.2 |

(Continued)

FOREIGN PATENT DOCUMENTS

| | | | | |
|---|---|---|---|---|
| DE | 102015010749 A1 | * | 3/2016 | ............. B62D 12/02 |
| EP | 0947376 A1 | * | 10/1999 | ............... B60K 1/02 |
| WO | 2012178010 | | 12/2012 | |

*Primary Examiner* — James A Shriver, II
*Assistant Examiner* — Steve Clemmons
(74) *Attorney, Agent, or Firm* — Carlson, Gaskey & Olds, P.C.

(57) ABSTRACT

An exemplary charging method includes charging a storage battery of a mule vehicle as a tow vehicle tows the mule vehicle to a stranded vehicle. The storage battery configured to be electrically coupled to a traction battery of an electrified vehicle to charge the traction battery. An exemplary charging assembly includes a mule vehicle. A storage battery of the mule vehicle charges as the mule vehicle is towed to a stranded vehicle. The storage battery is configured to be electrically coupled to a traction battery of the electrified vehicle to charge the traction battery.

16 Claims, 5 Drawing Sheets

(56) References Cited

U.S. PATENT DOCUMENTS

| | | | |
|---|---|---|---|
| 8,627,908 B2 * | 1/2014 | Wellborn | B62D 59/04 |
| | | | 180/14.2 |
| 8,700,284 B2 * | 4/2014 | Wojtkowicz | B60L 3/0046 |
| | | | 180/65.27 |
| 9,266,438 B2 * | 2/2016 | Power | B60L 11/1809 |
| 9,321,357 B2 * | 4/2016 | Caldeira | B60L 11/1801 |
| 9,407,105 B2 * | 8/2016 | Hyde | H02J 7/0054 |
| 9,457,666 B2 * | 10/2016 | Caldeira | B60L 3/0046 |
| 9,511,676 B2 * | 12/2016 | Loftus | H02J 7/0065 |
| 9,566,854 B2 * | 2/2017 | Kerschl | B60D 1/64 |
| 9,592,742 B1 * | 3/2017 | Sosinov | B60L 11/1827 |
| 9,857,255 B2 * | 1/2018 | Hagan | B60L 11/1809 |
| 9,887,570 B2 * | 2/2018 | Johnsen | B60L 11/005 |
| 10,220,717 B2 * | 3/2019 | Ricci | B64C 39/024 |
| 2006/0076836 A1 * | 4/2006 | Plishner | B60K 6/46 |
| | | | 307/66 |
| 2010/0051364 A1 * | 3/2010 | Arad | B60L 11/18 |
| | | | 180/65.31 |
| 2011/0025267 A1 | 2/2011 | Kamen et al. | |
| 2011/0042154 A1 * | 2/2011 | Bartel | B60L 7/10 |
| | | | 180/11 |
| 2011/0253463 A1 * | 10/2011 | Smith | B60D 1/00 |
| | | | 180/11 |
| 2012/0005031 A1 * | 1/2012 | Jammer | B60L 11/1816 |
| | | | 705/16 |
| 2012/0273285 A1 * | 11/2012 | Jensen | B60K 1/04 |
| | | | 180/65.1 |
| 2012/0299544 A1 | 11/2012 | Prosser et al. | |
| 2012/0303259 A1 * | 11/2012 | Prosser | H02J 7/0054 |
| | | | 701/400 |
| 2014/0375272 A1 | 12/2014 | Johnsen et al. | |
| 2017/0158007 A1 | 6/2017 | Lavoie | |
| 2017/0168503 A1 | 6/2017 | Amla et al. | |
| 2018/0001788 A1 * | 1/2018 | Geu | B60L 15/2009 |
| 2018/0290561 A1 * | 10/2018 | Baumgartner | B60L 15/38 |
| 2018/0312066 A1 * | 11/2018 | Lacaze | B60L 7/18 |

* cited by examiner

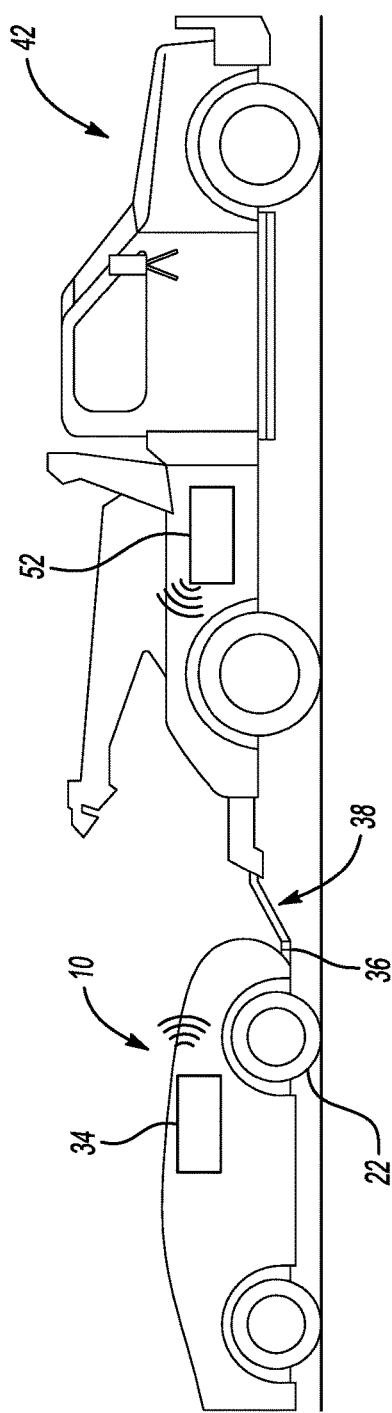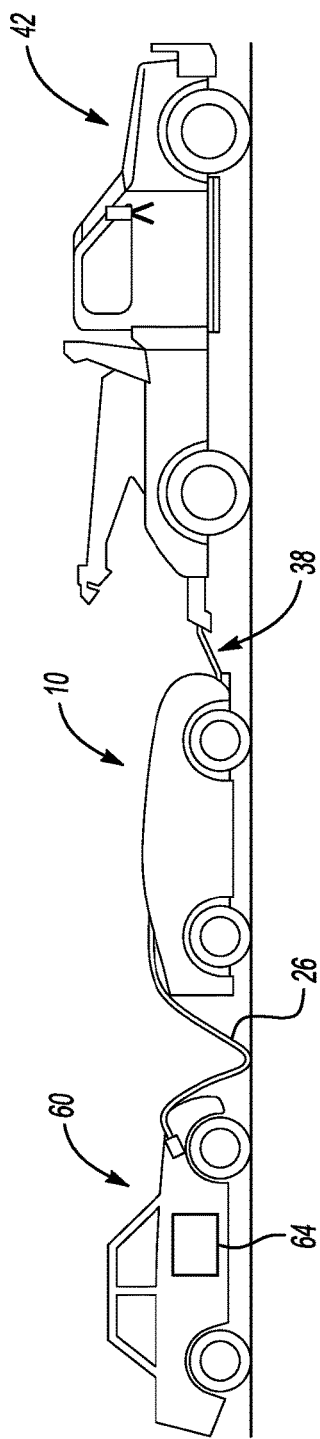

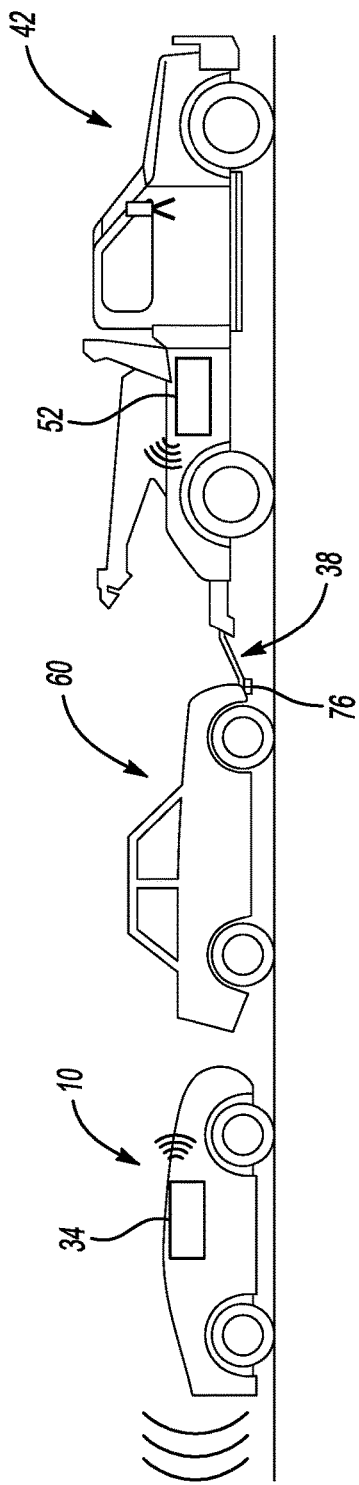
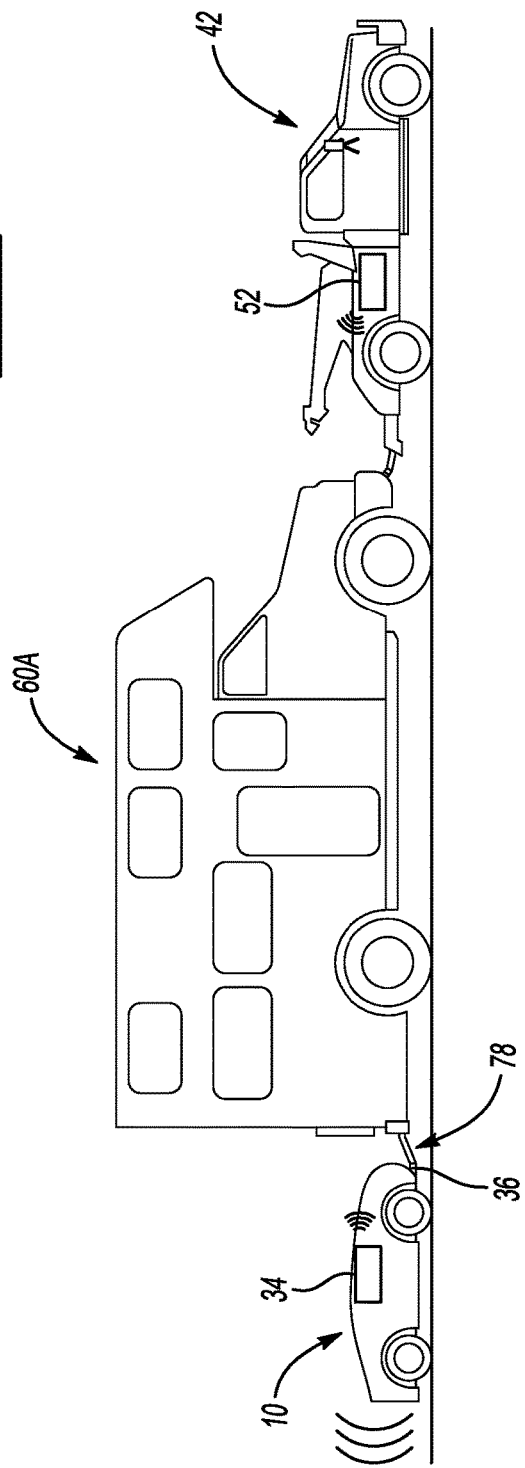

CHARGING METHOD AND ASSEMBLY UTILIZING A MULE VEHICLE WITH A STORAGE BATTERY

TECHNICAL FIELD

This disclosure relates generally to a mule vehicle having a storage battery used to charge a traction battery of an electrified vehicle. The storage battery of the mule vehicle can be charged as the mule vehicle is towed to the electrified vehicle that is stranded, or another type of stranded vehicle.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), and battery electric vehicles (BEVs).

If an amount of electrical energy held by the traction battery drops below a threshold level, the electrified vehicle may be stranded. That is, the traction battery, when sufficiently depleted, cannot adequately power the electric machines to provide propulsive power to wheels of the electrified vehicle. The traction battery can be recharged by a charging station, but a charging station is not always nearby. Also, the charging station, even if nearby, may be malfunctioning and unable to charge the traction battery.

Conventional vehicles can become stranded as well, due to, for example, a mechanical failure.

SUMMARY

A charging method according to an exemplary aspect of the present disclosure includes, among other things, charging a storage battery of a mule vehicle as a tow vehicle tows the mule vehicle to a stranded vehicle. The storage battery is configured to be electrically coupled to a traction battery of an electrified vehicle to charge the traction battery.

In a further non-limiting embodiment of the foregoing method, the mule vehicle is mechanically coupled to the tow vehicle when the tow vehicle tows the mule vehicle to the stranded vehicle.

A further non-limiting embodiment of any of the foregoing methods includes, after the tow vehicle and the mule vehicle reach the stranded vehicle, mechanically coupling the stranded vehicle to the tow vehicle, and then towing the stranded vehicle with the tow vehicle as the mule vehicle autonomously follows the stranded vehicle.

A further non-limiting embodiment of any of the foregoing methods includes, after the tow vehicle and the mule vehicle reach the stranded vehicle, mechanically coupling the stranded vehicle to the tow vehicle, and then towing the stranded vehicle with the tow vehicle.

A further non-limiting embodiment of any of the foregoing methods includes mechanically coupling the mule vehicle to the stranded vehicle and then using the mule vehicle to assist the towing of the stranded vehicle with the tow vehicle.

A further non-limiting embodiment of any of the foregoing methods includes pushing the stranded vehicle with the mule vehicle to assist the towing of the stranded vehicle with the tow vehicle.

A further non-limiting embodiment of any of the foregoing methods includes braking the mule vehicle to slow the stranded vehicle during the towing and thereby assist the towing of the stranded vehicle with the tow vehicle.

A further non-limiting embodiment of any of the foregoing methods includes towing the stranded vehicle with the tow vehicle as the mule vehicle is driven by an operator located on the mule vehicle.

A further non-limiting embodiment of any of the foregoing methods includes regeneratively charging the storage battery of the mule vehicle when towing the mule vehicle.

A further non-limiting embodiment of any of the foregoing methods includes adjusting the charging based on a distance that the tow vehicle tows the mule vehicle to the electrified vehicle.

A charging assembly according to an exemplary aspect of the present disclosure includes, among other things, a mule vehicle. A storage battery of the mule vehicle charges as the mule vehicle is towed to a stranded vehicle. The storage battery is configured to be electrically coupled to a traction battery of the electrified vehicle to charge the traction battery.

In a further non-limiting embodiment of the foregoing assembly, the storage battery is regeneratively charged when the mule is towed to the electrified vehicle.

In a further non-limiting embodiment of any of the foregoing assemblies, the mule vehicle is mechanically coupled to a tow vehicle when the mule vehicle is towed to the electrified vehicle.

In a further non-limiting embodiment of any of the foregoing assemblies, the mule vehicle is configured to autonomously follow the stranded vehicle while it is towed by the tow vehicle.

In a further non-limiting embodiment of any of the foregoing assemblies, the mule vehicle is configured to mechanically couple to the towed vehicle and to assist the towing of the stranded vehicle with the tow vehicle.

In a further non-limiting embodiment of any of the foregoing assemblies, the mule vehicle is configured to push the stranded vehicle to assist the towing of the stranded vehicle with the tow vehicle.

In a further non-limiting embodiment of any of the foregoing assemblies, the mule vehicle is configured to brake to slow the stranded vehicle to assist the towing of the stranded vehicle with the tow vehicle.

In a further non-limiting embodiment of any of the foregoing assemblies, the mule vehicle is configured to be driven by an operator located on the mule vehicle.

A further non-limiting embodiment of any of the foregoing assemblies, includes the stranded vehicle as the electrified vehicle, and further includes Electric Vehicle Supply Equipment of the mule vehicle that electrically couples the storage battery to the traction battery.

In a further non-limiting embodiment of any of the foregoing assemblies, the Electric Vehicle Supply Equipment comprises a charge cord.

BRIEF DESCRIPTION OF THE FIGURES

The various features and advantages of the disclosed examples will become apparent to those skilled in the art from the detailed description. The figures that accompany the detailed description can be briefly described as follows:

FIG. 3 shows a side view of a tow vehicle towing the mule vehicle of FIG. 1.

FIG. 4 shows a side view of the mule vehicle of FIG. 1 charging a traction battery of an electrified vehicle.

FIG. 6 shows a side view of the mule vehicle of FIG. 1 autonomously following the vehicle of FIG. 3, which is towed by the tow vehicle of FIG. 3.

FIG. 7 shows a side view of the mule vehicle of FIG. 1 according to another exemplary embodiment, where the mule vehicle is mechanically coupled to a vehicle towed by the tow vehicle of FIG. 3.

DETAILED DESCRIPTION

This disclosure relates generally to a mule vehicle having a storage battery that can be used to charge a traction battery of an electrified vehicle. If a charge level of the traction battery is sufficiently reduced, the electrified vehicle may be stranded at a location. The mule vehicle can then be towed to the location of the electrified vehicle so that a storage battery of the mule vehicle can be used to recharge the electrified vehicle.

The mule vehicle may be particularly useful for charging the traction battery of an electrified vehicle that is stranded in a location remote from any charge station. Notably, the storage battery of the mule vehicle can be charged as the mule vehicle is towed to the location of the electrified vehicle.

Figure 1:
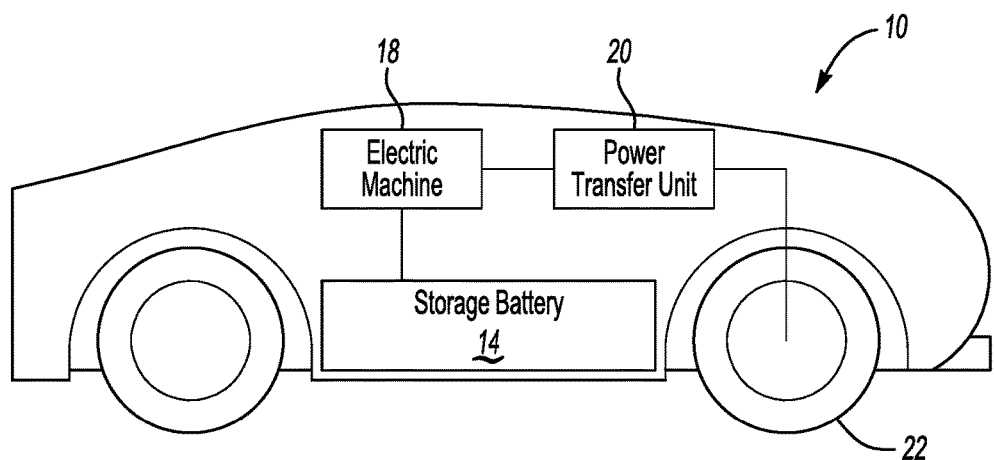
FIG. 1 shows a schematic side view of selected portions of a mule vehicle according to an exemplary embodiment of the present disclosure.

Referring now to FIG. 1, an exemplary mule vehicle 10 includes a storage battery 14, an electric machine 18, a power transfer unit 20, and a plurality of wheels 22. The example mule vehicle 10 is a battery electric vehicle (BEV) type of electrified vehicle. It should be understood, however, that the concepts described herein are not limited to BEVs and could extend to other mule vehicles including, but not limited to, mule vehicles that are plug-in hybrid electric vehicles (PHEVs), mule vehicles that are hybrid electric vehicle (HEVs), etc.

In an example embodiment, the mule vehicle 10 employs a drive system that includes a combination of at least the storage battery 14, the electric machine 18, and the power transfer unit 20. When employing this drive system, the mule vehicle 10 uses energy stored in the storage battery 14 to power the electric machine 18, which generates torque to drive the wheels 22 through the power transfer unit 20. The power transfer unit 20 can be a transmission gearbox with an epicyclic gear set, for example.

The storage battery 14 is, in this example, a battery pack comprising a plurality of individual battery cells. The exemplary storage battery 14 has a relative high energy capacity, say from 100-200 kilowatt hours.

Driving the wheels 22 with the power transfer unit 20 propels the mule vehicle 10. The drive system can thus be considered an electric drive system.

The electric machine 18 is a combined motor-generator in this example. In other examples, the electric machine 18 includes a motor and additionally includes a generator that is separate from the motor.

The electric machine 18 operates in a motor mode when employing the electric drive system. The electric machine 18 can also operate in a generator mode. When operating in the generator mode, rotation of the wheels 22 can drive the electric machine 18 through the power transfer unit 20. The electric machine 18 converts the mechanical energy from the wheels 22 into electrical energy that charges the storage battery 14. The wheels 22 can be rotated to drive the electric machine 18 when, for example, another vehicle is towing the mule vehicle 10.

When operating in the generator mode, the electric machine 18 can also utilize regenerative braking of the wheels 22 to generate electrical energy that charges the storage battery 14. That is, when the mule vehicle 10 is moving and the wheels 22 are slowed by regenerative braking, the kinetic energy of the mule vehicle 10 is converted by the electric machine 18 into electrical energy that charges the storage battery 14.

Figure 2:
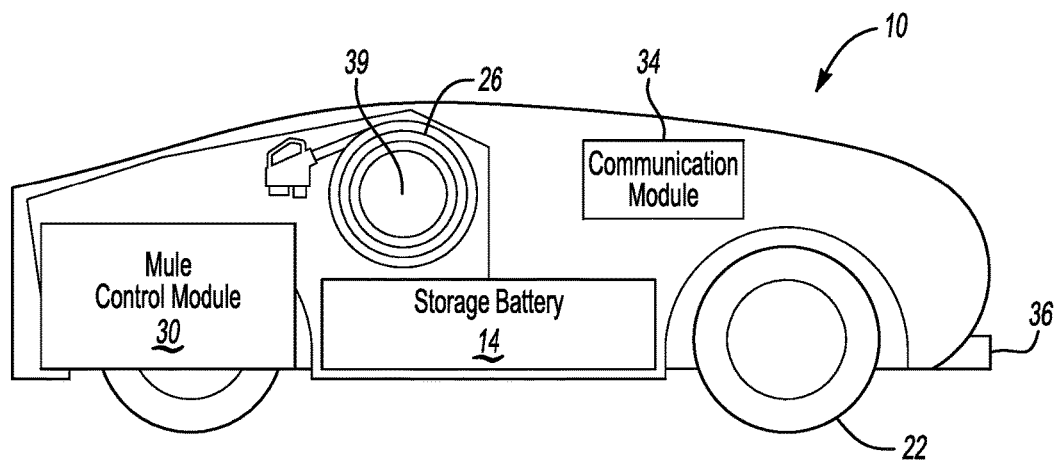
FIG. 2 shows a schematic side view of other selected portions of the mule vehicle of FIG. 1.

Referring to FIG. 2 with continued reference to FIG. 1, the mule vehicle 10 additionally includes a charge cord 26, a mule control module 30, a communication module 34, and a mule hitch 36.

The charge cord 26 can be electrically coupled to an electrified vehicle. When electrically coupled to an electrified vehicle, electrical energy from the storage battery 14 can flow through the charge cord 26 to charge a traction battery of the electrified vehicle. The mule control module 30, in this embodiment, can control electrical communication through the charge cord 26.

The charge cord 26 is an example type of Electric Vehicle Supply Equipment ("EVSE"). The mule vehicle 10 may include many types of EVSE to facilitate coupling to a wide variety of electrified vehicles. Exemplary EVSE could include charge cords with Type 1 connector interfaces, Type 2 connector interfaces (for AC charging), and combined charging system connectors. Other exemplary EVSE incorporated into the mule vehicle 10 could include quick-charging electrical connectors sold under the CHAdeMO tradename. The mule vehicle 10 effectively emulates a charge station from the perspective of the electrified vehicle having the traction battery being charged.

In this exemplary embodiment, the charge cord 26, and other EVSE, is packaged within a rear of the mule vehicle 10. This packaging can facilitate electronically coupling the charge cord 26 to the electrified vehicle when the mule vehicle 10 is parked in front of the electrified vehicle. A winding mechanism 39 is incorporated into the mule vehicle 10 to wind the charge cord 26 for storage.

As shown in FIG. 3, the mule hitch 36 of the mule vehicle 10 can be mechanically coupled to a tow hitch 38 of a tow vehicle 42, here a tow truck. As the tow vehicle 42 is driven, the tow vehicle 42 tows the mule vehicle 10 when the mule hitch 36 is mechanically connected to the tow hitch 38. Mechanically connected, for purposes of these disclosure, means a physical connection.

The tow vehicle 42 and the mule vehicle 10 can be, for example, located at a towing company. The tow vehicle 42 can tow the mule vehicle 10 to various locations remote from the towing company location.

Towing the mule vehicle 10 rotates the wheels 22, which can generate electrical power to charge the storage battery 14. Regenerative braking of the wheels 22 of the mule vehicle 10 as the mule vehicle 10 is towed by the tow vehicle 42 can also generate electrical power to charge the storage battery 14.

The mule vehicle 10, in this example, is relatively low to the ground, which can reduce aerodynamic load and facilitate power generation as the mule vehicle 10 is towed by the tow vehicle 42. That is, the powertrain of the tow vehicle 42 can deliver a certain maximum continuous power, which may limit the power generation of the mule vehicle 10. To facilitate a low road load, the storage battery 14 is positioned in a vertically low area of the mule vehicle 10.

In this example, the communication module 34 can communicate wirelessly with a communication module 52 of the tow vehicle 42. The wireless communication between the communication module 34 of the mule vehicle 10 and the communication module 52 of the tow vehicle 42 can include, for example, reporting a state of charge of the storage battery 14 through the communication module 34 to the communication module 52. A driver of the tow vehicle 42 can review the state of charge of the storage battery 14 via a display (not shown) within a cabin of the tow vehicle 42.

Another example communication could be a command sent from the communication module 52 of the tow vehicle 42 to the communication module 34 of the mule vehicle 10. The command can instruct the mule vehicle 10 to begin a storage battery charge procedure where rotation of the wheels 22 causes the storage battery 14 to charge. When the storage battery charging procedure is not initiated, the mule vehicle 10 can be towed without rotation of the wheels 22 charging the storage battery 14.

Although the communications between the communication module 34 of the mule vehicle 10 and the communication module 52 of the tow vehicle 42 are described as wireless communications, other examples could include other types of communications. For example, the mule vehicle 10 and the tow vehicle 42 could communicate through wired connections extending along the tow hitch 38 from the tow vehicle 42 to the mule vehicle 10.

Referring now to FIG. 4 with continuing reference to FIGS. 2-3, a stranded vehicle is, in this example, an electrified vehicle 60 including a traction battery 64. If the traction battery 64 is depleted such that the electrified vehicle 60 is stranded at a location, an operator of the electrified vehicle 60 can contact the towing company to request a charge of the electrified vehicle 60.

In response to the request, the tow vehicle 42 mechanically couples the mule vehicle 10 to the tow vehicle 42, and then tows the mule vehicle 10 to the location of the electrified vehicle 60. After the mule vehicle 10 arrives at the location of the electrified vehicle 60, the charge cord 26 of the mule vehicle 10 can be electrically coupled to the electrified vehicle 60 as shown in FIG. 4. The storage battery 14 in the mule vehicle 10 can then charge the traction battery 64 of the electrified vehicle 60.

Based on, among other things, a distance that the tow vehicle 42 and the mule vehicle 10 must travel to reach the electrified vehicle 60, the tow vehicle 42 can initiate a command through the communication module 52 to begin the storage battery charge procedure. The storage battery charge procedure can be timed to begin so that when the mule vehicle 10 reaches the electrified vehicle 60, the storage battery 14 is charged to a desired level, has a state of charge sufficient to charge the traction battery 64 of the electrified vehicle 60, or both.

Further, if a distance that the tow vehicle 42 and the mule vehicle 10 must travel to the electrified vehicle 60 is relatively small, the tow vehicle 42 may tow the mule vehicle 10 at a slower speed. This has two effects: firstly, the aerodynamical road load of the tow vehicle 42 and the mule vehicle 10 is reduced. As a consequence, a higher fraction of the power of the tow vehicle 42 can be used for power generation in the mule vehicle 10. Secondly, the tow vehicle 42 and mule vehicle 10 will take longer to reach the electrified vehicle 60, and hence have more time for charging so that the mule vehicle 10 will have sufficient energy stored in the storage battery 14 to charge the traction battery 64 of the electrified vehicle 60.

In this example, the mule vehicle 10 can DC fast charge the traction battery 64, which can reduce a time period required to charge the traction battery 64 of the electrified vehicle 60 when compared to, for example, an AC charge. In another example, the mule vehicle 10 couples to the electrified vehicle to AC charge the traction battery 64.

In some examples, the AC charging provided by the mule vehicle 10 includes charges up to an E-phase of 43 kilowatts, and the DC charging includes relatively high powered charging such as 150 kilowatts at 400 Volts or 350 kilowatts at 800 Volts.

The mule control module 30 can provide control over the charging of the traction battery 64 with the storage battery 14, such as by controlling a rate of the charging. The mule control module 30 can include an interface, such as a touch screen, that an individual can interact with to start a charging of the traction battery 64, stop a charging, control a rate of charging, etc. The mule control module 30 is, in this example, located on a right side (or passenger side) of the mule vehicle 10. If the electrified vehicle 60 is stranded on a right side of a road, which may be typical, the individual can interact with the mule control module 30 on a side of the mule vehicle 10 away from the flow of traffic along the road.

In an embodiment, the mule control module 30 includes a processing unit and non-transitory memory for executing various charging control strategies. The mule control module 30 can receive and process various inputs when controlling the charging, such as an input indicating that the operator of the tow vehicle 42, or the driver of the electrified vehicle 60, is requesting that the charging begin.

The processing unit, in an embodiment, is configured to execute one or more programs stored in the memory of the mule control module 30. A first exemplary program, when executed, calculates an efficient rate at which to charge the traction battery 64.

Figure 5A:
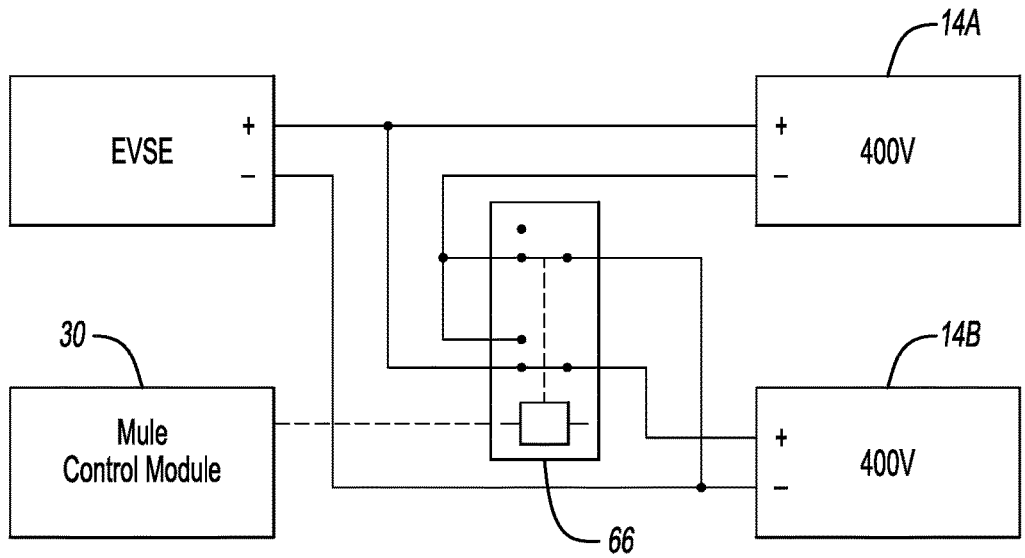
FIG. 5A shows a schematic view of a portion of the mule vehicle of FIG. 1 when a storage battery of the mule vehicle is in a parallel mode.
Figure 5B:
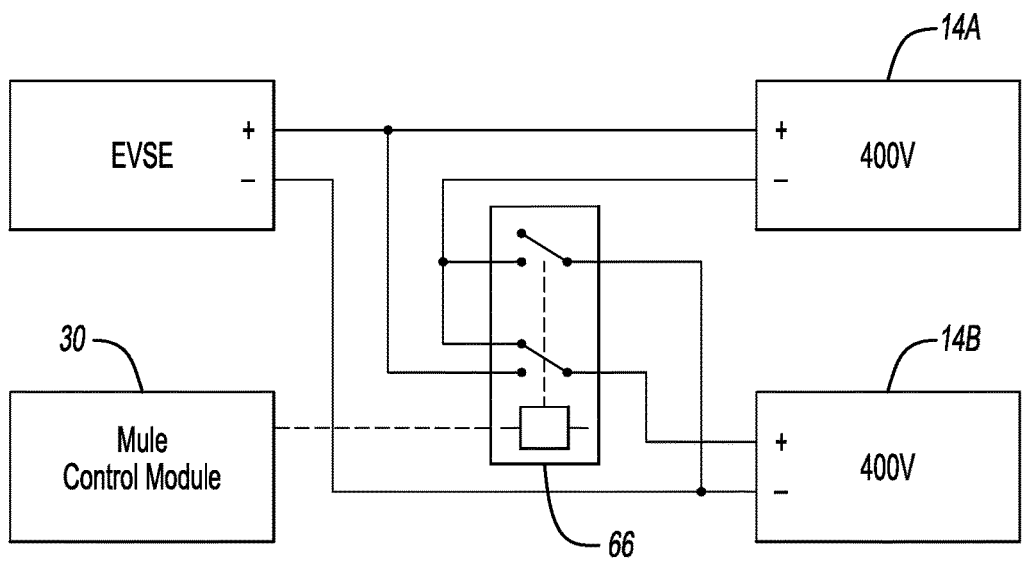
FIG. 5B shows a schematic view of the portion of the mule vehicle of FIG. 1 when the storage battery of the mule vehicle is in a series mode.

In an exemplary non-limiting embodiment shown schematically in FIGS. 5A and 5B, the storage battery 14 of the mule vehicle 10 can be split into two separate battery packs 14A, 14B of approximately 400 Volts each. The mule control module 30 can transition a switch 66 to place the battery packs 14A, 14B in parallel or series. When the battery packs 14A, 14B are in the parallel as shown in FIG. 5A, output from the EVSE can be 400 Volts. When the battery packs 14A, 14B are in series as shown in FIG. 5B, output from the EVSE can be 800 Volts. The mule control module 30 can control transitions of the switch to charge the traction battery 64 with 400 Volts or 800 Volts as desired.

From time to time, the electrified vehicle 60 may require towing by the tow vehicle 42. For example, the tow vehicle 42 and the mule vehicle 10 could arrive at the electrified vehicle 60 and determine that electronic complications prevent driving the electrified vehicle 60, even if the traction battery 64 is recharged. In such situations, the tow vehicle 42 may tow the electrified vehicle 60 back to the location of the towing company, or to another location.

Referring to FIG. 6 with reference to FIGS. 1 and 2, to tow a stranded vehicle, which is the electrified vehicle 60 in this example, the mule vehicle 10 is first mechanically decoupled from the tow hitch 38 of the tow vehicle 42. A vehicle hitch 76 of the electrified vehicle 60 can then be mechanically coupled to the tow hitch 38. The electrified vehicle 60 thus substantially takes the place of the mule vehicle 10.

To avoid leaving behind the mule vehicle 10, the mule vehicle 10 in this exemplary non-limiting embodiment is configured to autonomously follow the electrified vehicle 60 as the tow vehicle 42 drives and tows the electrified vehicle 60.

Prior to autonomously following the electrified vehicle 60, the mule vehicle 10 can be placed into a learning mode where the mule vehicle 10 scans a rear of the electrified vehicle 60. In the learning mode, sensors on the mule vehicle 10 detect and store characteristics of the rear of the electrified vehicle 60. The sensors could utilize echoes and other types of sensory recognition techniques to detect the characteristics. The characteristics can be stored within the memory of the mule control module 30 and referenced as required.

After the learning mode is sufficiently complete, the mule vehicle 10 is placed in a follow mode. Then, as the tow vehicle 42 moves forward and begins to tow the electrified vehicle 60, the mule vehicle 10 follows the electrified vehicle 60 towed by the tow vehicle 42. The mule vehicle 10 can rely on optical, LIDAR, and other sensors for tracking a distance to the electrified vehicle 60 as the mule vehicle 10 autonomously follows the electrified vehicle 60.

When autonomously following the electrified vehicle 60, the mule vehicle 10 can use electrical energy from the storage battery 14 to power the electric machine 18 to drive the wheels 22.

Also, the communication module 34 of the mule vehicle 10 can remain in communication with the communication module 52 of the tow vehicle 42. The communications could cause the charging control module to activate lighting systems on the mule vehicle 10, such as brake lights, in response to braking of the tow vehicle 42. Signals from the communication module 52 can also cause the mule vehicle 10 to accelerate, decelerate, steer to the left or right, slow down, etc.

In this exemplary embodiment, due to the relatively close distance between the mule vehicle 10 and the electrified vehicle 60 during the autonomous following, the mule vehicle 10 does not need to fully interpret traffic situations, traffic lights, etc. Instead, the operator of the tow vehicle 42 interprets these traffic situations and controls the tow vehicle 42 accordingly. The mule vehicle 10 then continues to follow the electrified vehicle 60. As the mule vehicle 10 does not need to fully interpret traffic situations, the equipment required for autonomous operation of the mule vehicle 10 is simplified. In some examples, only a basic camera or radar sensor on the mule vehicle 10 is required.

In some examples, steering the mule vehicle 10 when autonomously following the electrified vehicle relies on the characteristics of the electrified vehicle 60 detected and stored during the learning mode. A characteristic could include for example, a location of a tail light of the electrified vehicle 60, or a laterally outermost edge of the electrified vehicle 60. The mule vehicle 10 is then automatically steered by the mule control module 30 in response to these features being repositioned as the electrified vehicle 60 is towed.

For example, if a camera of the mule vehicle 10 detects that a right tail light of the electrified vehicle is deviating or moving to the left, the mule vehicle 10 is automatically steered to the left until the right tail light returns to a target position. The mule vehicle 10 can utilize a closed loop controller (e.g., Proportional Integral, Proportional Derivative, or Proportional Integral Derivative) to control steering based on the detected movement of the right tail light in the electrified vehicle 60.

The mule vehicle 10 can be trained on particular features during the learning mode. The automatic steering of the mule vehicle 10 based on the detected movement of features in the electrified vehicle 60 can be in addition to, or instead of, steering control commands sent by the communication module 52 to the mule vehicle 10. The mule vehicle 10, during the learning mode, may prompt the tow vehicle 42 or the electrified vehicle 60 to activate certain features to assist with the learning. The mule vehicle 10 may prompt the operator to activate, for example, a turn signal of the electrified vehicle 60, which helps the mule vehicle 10 identify and learn the location of the turn signal.

In some examples, if the sensors on the mule vehicle 10 become unable to detect the electrified vehicle 60, a steering angle of the mule vehicle 10 can be kept constant and friction brakes of the mule vehicle 10 are applied to bring the mule vehicle 10 to a controlled stop. A snow plow, for example, could direct snow between the mule vehicle 10 and the electrified vehicle 60, which could interfere with the sensors of the mule vehicle 10 detecting the electrified vehicle 60.

If a control system was able to use the sensory data obtained to interpret the geometry of the road before the direct line of sight between the mule vehicle 10 and the electrified vehicle 60 was lost, the stored geometry of the road may be followed. Further, if satellite and navigation information about the geometry of the road were saved within the memory of mule vehicle 10 as road data, that road data could be followed when bringing the mule vehicle 10 to a controlled stop.

Notably, a person having skill in this art and the benefit of this disclosure would understand how to configure a vehicle to autonomously follow another type of towed vehicle utilizing a learning mode and a follow mode. For example, non-electrified, (i.e., conventional) vehicles may require being towed to a location where they can be repaired. In such examples, the mule vehicle 10 can autonomously follow the non-electrified vehicle that is being towed by the tow vehicle 42.

Referring now to FIG. 7, in another exemplary embodiment, the mule hitch 36 of the mule vehicle 10 is mechanically coupled to a tow hitch 78 of a towed vehicle 60A towed by the tow vehicle 42. The towed vehicle 60A is, in this example, a stranded vehicle that is relatively large and non-electric (i.e., conventional). The mule vehicle 10 can assist the tow vehicle 42 with towing the towed vehicle 60A, rather than autonomously following the towed vehicle 60A. Assisting the tow vehicle 42 with towing the towed vehicle 60A can, among other things, reduce fuel consumption of the tow vehicle 42 during the towing.

The towing of the towed vehicle 60A can be assisted by the mule vehicle 10 in many ways. For example, if the tow vehicle 42 is braking to slow the towed vehicle 60A, the mule vehicle 10 can brake to slow the towed vehicle 60A. Further, the mule hitch 36 and the tow hitch 78 can be configured to permit the mule vehicle 10 to push the towed vehicle 60A, and thereby assist in moving the towed vehicle 60A forward. The pushing of the towed vehicle 60A can reduce the towing load on the tow vehicle 42.

Figure 8:
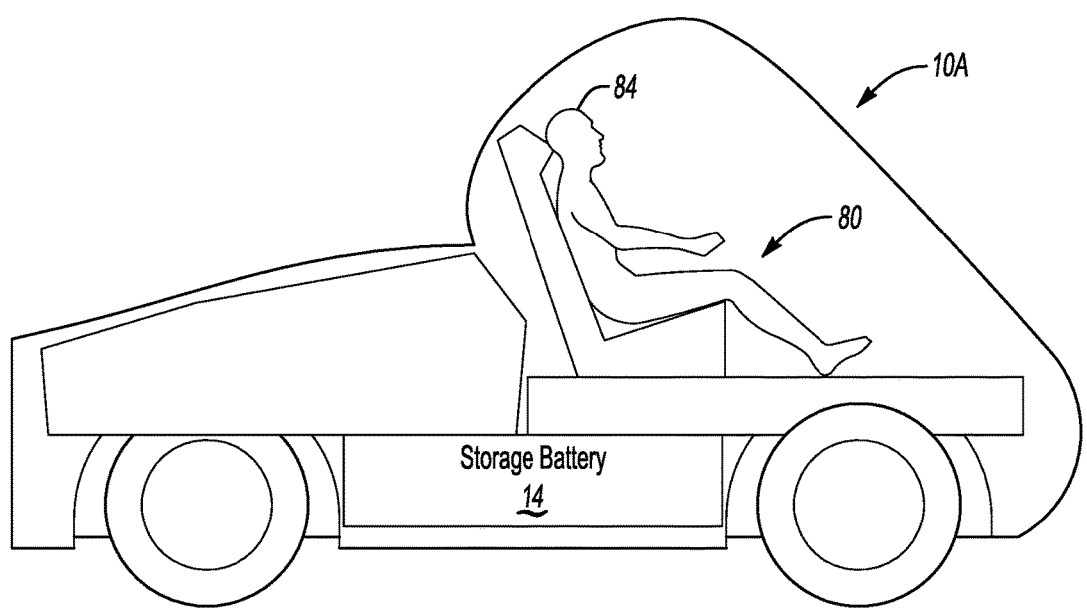
FIG. 8 shows a side view of a mule vehicle according to yet another exemplary embodiment where the mule vehicle is driven by an operator located on the mule vehicle.

Referring now to FIG. 8 with reference to FIG. 4, another exemplary mule vehicle 10A includes a cabin area 80 occupied by an operator 84. Like the mule vehicle 10, the mule vehicle 10A includes the storage battery 14 that can be charged when the mule vehicle 10A is towed by the tow vehicle 42, and can be used to charge the traction battery 64 of the electrified vehicle 60.

As required, the mule vehicle 10A can be driven by the operator 84 independently from the tow vehicle 42. Initially, the mule vehicle 10A can be towed by the tow vehicle 42 to a location of the electrified vehicle 60. If the tow vehicle 42 is then required to tow the electrified vehicle 60, the operator 84 can drive the mule vehicle 10A back to, for example, the towing station. Since the mule vehicle 10A can be driven by the operator 84, the mule vehicle 10 does not need to autonomously follow the electrified vehicle 60 and does not need to be mechanically coupled to the electrified vehicle 60. In some examples, the operator 84 can use the mule vehicle 10A for transportation when not returning from the location of the electrified vehicle 60, such as for commuting the operator 84 to and from work.

Features of the disclosed examples include a mule vehicle having a storage battery that can be charged when the mule vehicle is towed. Time spent charging the storage battery with a charging station can thus be reduced or eliminated.

The mule vehicle, in some embodiments, can be mechanically coupled to another vehicle towed by a tow vehicle and assist in the towing of the other vehicle by, for example, assisting in braking the other vehicle or by pushing the other vehicle.

In some embodiments, the mule vehicle can be mechanically decoupled from the other vehicle towed by the tow vehicle, and configured to autonomously follow the other vehicle. An operator driving the tow vehicle is thus not required. Instead, a single driver operating the tow vehicle can return the tow vehicle, the other vehicle, and the mule vehicle to, for example, a service station.

In some embodiments, the mule vehicle can be driven by a driver in a cabin of the mule vehicle.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A charging method, comprising:
   charging a storage battery of a mule vehicle as a tow vehicle tows the mule vehicle to a stranded vehicle, the storage battery configured to be electrically coupled to a traction battery of an electrified vehicle to charge the traction battery; and
   after the tow vehicle and the mule vehicle reach the stranded vehicle, mechanically coupling the stranded vehicle to the tow vehicle, and then towing the stranded vehicle with the tow vehicle as the mule vehicle autonomously follows the stranded vehicle.

2. The method of claim 1, wherein the mule vehicle is mechanically coupled to the tow vehicle when the tow vehicle tows the mule vehicle to the stranded vehicle.

3. The method of claim 1, further comprising regeneratively charging the storage battery of the mule vehicle when towing the mule vehicle.

4. The method of claim 1, further comprising adjusting the charging based on a distance that the tow vehicle must travel to reach the stranded vehicle.

5. A charging method, comprising:
   charging a storage battery of a mule vehicle as a tow vehicle tows the mule vehicle to a stranded vehicle, the storage battery configured to be electrically coupled to a traction battery of an electrified vehicle to charge the traction battery; and
   after the tow vehicle and the mule vehicle reach the stranded vehicle, mechanically coupling both the stranded vehicle and the mule vehicle to the tow vehicle, and then towing the stranded vehicle with the tow vehicle while using the mule vehicle to assist the towing of the stranded vehicle with the tow vehicle.

6. The method of claim 5, further comprising pushing the stranded vehicle with the mule vehicle to assist the towing of the stranded vehicle with the tow vehicle.

7. The method of claim 5, further comprising braking the mule vehicle to slow the stranded vehicle being towed and thereby assist the towing of the stranded vehicle with the tow vehicle.

8. The method of claim 5, further comprising towing the stranded vehicle with the tow vehicle as the mule vehicle is driven by an operator located on the mule vehicle.

9. A charging assembly, comprising
   a mule vehicle; and
   a storage battery of the mule vehicle that charges as the mule vehicle is towed to a stranded vehicle, the storage battery configured to be electrically coupled to a traction battery of an electrified vehicle to charge the traction battery, wherein the mule vehicle is mechanically coupled to a tow vehicle when the mule vehicle is towed to the stranded vehicle, wherein the mule vehicle is configured to mechanically couple to the stranded vehicle and to assist the towing of the stranded vehicle with the tow vehicle.

10. The charging assembly of claim 9, wherein the storage battery is regeneratively charged when the mule is towed to the stranded vehicle.

11. The charging assembly of claim 9, wherein the mule vehicle is configured to push the stranded vehicle to assist the towing of the stranded vehicle with the tow vehicle.

12. The charging assembly of claim 9, wherein the mule vehicle is configured to brake to slow the stranded vehicle to assist the towing of the stranded vehicle with the tow vehicle.

13. The charging assembly of claim 9, wherein the mule vehicle is configured to be driven by an operator located on the mule vehicle.

14. The charging assembly of claim 9, wherein the stranded vehicle is the electrified vehicle, and further comprising Electric Vehicle Supply Equipment of the mule vehicle that electrically couples the storage battery to the traction battery of the electrified vehicle.

15. The charging assembly of claim 14, wherein the Electric Vehicle Supply Equipment comprises a charge cord.

16. A charging assembly, comprising
   a mule vehicle; and
   a storage battery of the mule vehicle that charges as the mule vehicle is towed to a stranded vehicle, the storage battery configured to be electrically coupled to a traction battery of an electrified vehicle to charge the traction battery, wherein the mule vehicle is mechanically coupled to a tow vehicle when the mule vehicle is towed to the stranded vehicle, wherein the mule vehicle is configured to autonomously follow the stranded vehicle when the stranded vehicle is towed by the tow vehicle.

* * * * *